(12) United States Patent
Hottinen

(10) Patent No.: US 7,864,877 B2
(45) Date of Patent: Jan. 4, 2011

(54) DATA TRANSMISSION IN COMMUNICATION SYSTEM BY DISABLING RADIATION PATTERNS

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 1162 days.

(21) Appl. No.: 11/512,257

(22) Filed: Aug. 30, 2006

(65) Prior Publication Data

US 2007/0070939 A1    Mar. 29, 2007

(30) Foreign Application Priority Data

Sep. 28, 2005    (FI) .................................. 20055516

(51) Int. Cl.
*H04B 7/02* (2006.01)
*H04L 1/02* (2006.01)
(52) U.S. Cl. ......................... 375/267; 375/347; 370/328
(58) Field of Classification Search ................. 375/267, 375/347, 346, 316; 370/328
See application file for complete search history.

(56) References Cited

U.S. PATENT DOCUMENTS

| | | | |
|---|---|---|---|
| 4,176,356 A * | 11/1979 | Foster et al. ................. | 342/367 |
| 6,078,570 A | 6/2000 | Czaja et al. | |
| 6,741,587 B2 | 5/2004 | Holma et al. | |
| 6,922,116 B1 * | 7/2005 | Gordon et al. ............... | 333/128 |
| 2003/0186698 A1 * | 10/2003 | Holma et al. ................ | 455/436 |

FOREIGN PATENT DOCUMENTS

| | | |
|---|---|---|
| EP | 1117268 | 7/2001 |
| WO | WO 99/60733 | 11/1999 |

OTHER PUBLICATIONS

International Search Report for International Application No. PCT/FI2006/050414 filed Sep. 27, 2006.

* cited by examiner

*Primary Examiner*—David C Payne
*Assistant Examiner*—Brian J Stevens
(74) *Attorney, Agent, or Firm*—Squire, Sanders & Dempsey, LLP

(57) ABSTRACT

A transmitter for a communication system, the transmitter being configured to transmit a signal including symbols to a receiver using at least two transmit radiation patterns so that information content of a symbol of temporal length T is transmitted using at least two transmit radiation patterns, realize that the receiver, using Nr receive radiation patterns, disables N receive radiation patterns, wherein 1<=N<Nr so that Nr−N effective receive radiation patterns are formed for receiving the transmitted signal, adapt transmit radiation patterns or the number of symbols so that the number of transmitted symbols in a time interval of length T when receiving with Nr−N receive radiation patterns is less or equal to the number of symbols transmitted in a time interval of length T when the receiver is receiving with Nr receive radiation patterns.

18 Claims, 3 Drawing Sheets

DATA TRANSMISSION IN COMMUNICATION SYSTEM BY DISABLING RADIATION PATTERNS

FIELD

Figure 1:
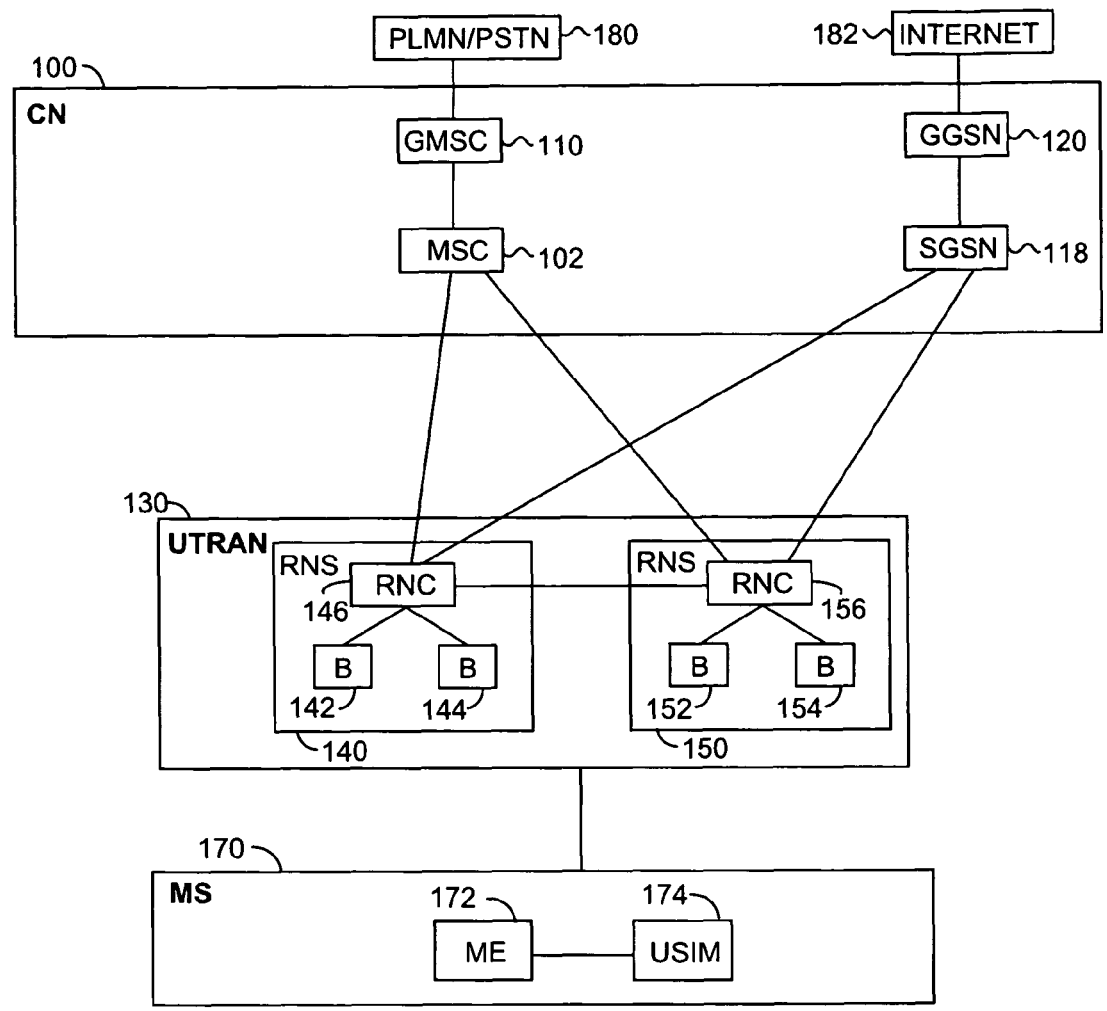

The invention relates to a transmitter, a receiver, a data transmission system, a data transmission method, and a computer program product. More particularly, the invention relates to transmission of data in conjunction with disablement of at least one receive radiation pattern in the receiver.

BACKGROUND

Third (3G) and fourth (4G) generation telecommunication systems and wireless local area networks employ multiple frequency bands and handover measurements are needed to determine which band to use at any given time. The relevant methods are called inter-frequency measurements, which are used as an input to inter-system or inter-frequency handovers protocols or other resource control units.

Inter-frequency measurement is illustrated in U.S. Pat. No. 6,741,587 B2. In the reference, one receiving antenna is reserved for an inter-frequency measurement and correspondingly one transmit antenna is disabled. The method disclosed in the reference does not utilize transmitter resources optimally, because during the inter-frequency measurement, all the transmit antennas cannot be utilized. Furthermore, effectiveness of the transmission during measurements is compromised.

SUMMARY

An object of the present invention is thus to provide an improved method and apparatus so as to overcome the disadvantage mentioned above.

In one aspect of the invention, there is provided a transmitter for a communication system, the transmitter being configured to transmit a signal including symbols to a receiver using at least two transmit radiation patterns so that information content of a symbol of temporal length T is transmitted using at least two transmit radiation patterns, realize that the receiver, using Nr receive radiation patterns, disables N receive radiation patterns, wherein $1<=N<Nr$ so that Nr–N effective receive radiation patterns are formed for receiving the transmitted signal, adapt transmit radiation patterns or the number of symbols so that the number of transmitted symbols in a time interval of length T when receiving with Nr–N receive radiation patterns is less or equal to the number of symbols transmitted in a time interval of length T when the receiver is receiving with Nr receive radiation patterns.

In another aspect of the invention, there is provided a receiver for a communication system, the receiver being configured to receive a signal including symbols from a transmitter by using Nr receive radiation patterns, the symbols being transmitted so that information content of a symbol of temporal length T is transmitted using at least two transmit radiation patterns, disable N receive radiation patterns, wherein $1<=N<Nr$ from reception of the transmitted signal so that Nr–N effective receive radiation patterns are formed, and receive the transmitted signal adapted to N–Nr effective receive radiation patterns so that transmit radiation patterns or the number of symbols in a time interval of length T when receiving with Nr–N receive radiation patterns is less or equal to the number of symbols transmitted in a time interval of length T when the receiver is receiving with Nr receive radiation patterns.

In still another aspect of the invention, there is provided a data transmission system, comprising a first transceiver configured to transmit a signal including symbols, the signal being transmitted to a second transceiver receiving by Nr receive radiation patterns, by using at least two transmit radiation patterns so that information content of a symbol of temporal length T is transmitted via at least two transmit radiation patterns, the first transceiver further being configured to realize that the second transceiver disables N receive radiation patterns, wherein $1<=N<Nr$ so that Nr–N effective receive radiation patterns are formed for receiving the transmitted signal, adapt transmit radiation patterns or the number of symbols so that the number of transmitted symbols in a time interval of length T, when the second transceiver receives with Nr–N receive radiation patterns, is less or equal to the number of symbols transmitted in a time interval of length T when the receiver is receiving with Nr receive radiation patterns.

In still another aspect of the invention, there is provided a data transmission method, comprising steps of transmitting, from a first transceiver to a second transceiver receiving by Nr receive radiation patterns, a signal including symbols by using at least two transmit radiation patterns so that information content of a symbol of temporal length T is transmitted via at least two transmit radiation patterns, realizing, in the first transceiver, that the second transceiver disables N receive radiation patterns, wherein $1<=N<Nr$ so that Nr–N effective receive radiation patterns are formed for receiving the transmitted signal, adapting transmit radiation patterns or the number of symbols so that the number of transmitted symbols in a time interval of length T, when the second transceiver receives with Nr–N receive radiation patterns, is less or equal to the number of symbols transmitted in a time interval of length T when the receiver is receiving with Nr receive radiation patterns.

In still another aspect of the invention, there is provided a computer program product, comprising software code portions for executing steps of transmitting, from a first transceiver to a second transceiver receiving by Nr receive radiation patterns, a signal including symbols by using at least two transmit radiation patterns so that information content of a symbol of temporal length T is transmitted via at least two transmit radiation patterns, realizing, in the first transceiver, that the second transceiver disables N receive radiation patterns, wherein $1<=N<Nr$ so that Nr–N effective receive radiation patterns are formed for receiving the transmitted signal, adapting transmit radiation patterns or the number of symbols so that the number of transmitted symbols in a time interval of length T, when the second transceiver receives with Nr–N receive radiation patterns, is less or equal to the number of symbols transmitted in a time interval of length T when the receiver is receiving with Nr receive radiation patterns.

The preferred embodiments of the invention are disclosed in the dependent claims.

As an example, the invention can be applied to UTRAN (UMTS Terrestrial Radio Access Network), which belongs to the third generation telecommunications system and is implemented by WCDMA (Wideband Code Division Multiple Access) technology. The invention is not, however, limited to a WCDMA radio interface, but applications exist which are implemented with MC-CDMA (Multi-Carrier Code Division Multiple Access) or OFDM (Orthogonal Frequency Division Multiplexing) technologies, or any combination thereof, for example. The invention may in general be applied to systems capable of multi-antenna transmission, such as MIMO (Multiple-input Multiple Output) and MISO (Multiple-Input Single Output) systems.

In the invention, a transmitter, such as a base station, transmits a signal to a receiver, which can be a mobile terminal, for instance. The transmitter transmits the signal by applying at least two transmit radiation patterns. Each transmit radiation pattern may be formed by using one or more transmit antennas by applying sectorization, spatially selective directional antenna technologies, closed-loop or open-loop beamforming, spatial weighting of the signals transmitted from antennas, or by having two similar radiation patterns transmitted from two different spatial locations or with different polarization.

The receiver can have at least two receive radiation patterns available for reception of the transmitted signal. Correspondingly to the transmitter, also the receive radiation patterns can be established by using one or more antennas.

In the invention, the transmitter finds out that the receiver disables one or more receive radiation patterns from reception of the transmitted signal. The transmitter may become aware of the receiver disabling one or more radiation patterns by explicit signaling between the transmitter and the receiver, or by implicitly extracting this information from channel measurement reports received from the receiver.

In one embodiment, the reason for disablement of one or more receive radiation patterns is an inter-frequency measurement performed by the receiver. In one embodiment, a transmitter and a receiver communicate a time interval in which the measurements are to be carried out. Higher layer signalling may be used for communicating the time interval, for instance. In one embodiment, the transmitter initiates the inter-frequency measurements when noticing a need for a handover, for instance.

In another embodiment, the receiver may start inter-frequency measurements on its own initiative, due to deterioration of the received signal, for instance. The receiver may then inform the transmitter of the inter-frequency measurements, for example when the receiver is about to start or when it has already started the measurements.

In still another embodiment, the receiver may not give any explicit information to the transmitter about starting the measurements. The transmitter can, however, implicitly derive this information from channel quality measurement or channel quality indicator reports received from the receiver, for instance.

In still another embodiment, the receiver informs the transmitter that the transmission method has to be changed, the reason being inter-frequency measurement or some other reason. This embodiment is advantageous in that the receiver does not need to signal inter-frequency measurement results, or parameters derived from inter-frequency measurement results, to the transmitter before they are worth signalling. The receiver measurements are then transparent to the transmitter.

In this measurement interval or intervals, the receiver utilizes at least one of its antennas or RF measurement units for the measurements, whereby the number of receive antennas, that is, effective antennas that can be used for data reception is reduced. The RF measurement unit may comprise an analog RF chain which is connected to different antennas. The RF measurement unit may also be connected to more than one antenna, e.g. so that the input to the measurement unit is combined from more than one antenna before making the measurement. For instance, an analog phase shift may be applied in the receiver in antenna 2, and this phase-shifted analog signal is combined into the signal received at antenna 1, to form a linearly combined signal for one measurement unit.

In the invention, the transmitter adapts its transmission resources or methods to the number of effective receive radiation patterns that are available for data reception in the receiver. In one embodiment, the transmitter adapts its transmission so that the transmit signal is receivable in the receiver with the same reliability before and after disablement of at least one receive radiation pattern.

In one embodiment, the rank of the modulation matrix used for modulating the transmit signal is at most the number of effective receive radiation patterns.

In still another embodiment, the transmitter is configured to adapt its transmission to the number of effective receive radiation patterns in the receiver by changing the used space-time block-coding. Different ways of choosing a modulating matrix have been illustrated in PCT/FI2004/000449, which is incorporated herein by reference.

In an embodiment, the transmitter is configured to adapt its transmission to the reduced number of receive radiation patterns of the receiver by reducing the symbol rate of the used space-time block coding. Symbol rate here means the number of essentially independent symbols in a transmit matrix divided by the number of rows in the matrix (assuming that columns designate symbols transmitted to different radiation patterns and rows a symbol period of length, say, T=1). For instance, in STTD space-time modulation, the symbol rate is 1 if the symbol length T is normalized to 1. Normalization is used here to quantify the symbol rate of the space-time modulation part of the transmission method, while the effective symbol rate also depends on the other parts of the transmitter, such as the channel bandwidth, coding rate, chip rate and so on.

In one embodiment, the transmitter is configured to maintain the symbol rate of the transmission and change the form of at least one of the at least two transmit radiation patterns. That can be achieved by beam forming or closed-loop transmit diversity, for instance.

In one embodiment, adaptation to the number of receive radiation patterns can be done by changing coding gain in the transmitter. Then, for instance, the space-time modulation method can be maintained as STTD, but the bandwidth expansion factor can be greater when at least one receive radiation pattern is disabled from reception of transmit information. The bandwidth expansion factor can illustrate a turbo-coding rate or a spreading code or the number of parallel allocated channels in multi-code CDMA or in multi-carrier modulation, such as OFDM. In some cases, coding gain is increased by increasing T, the symbol length. In other cases, coding gain is increased by modulating symbols within the space-time modulation matrix differently so that the effective coding gain is increased, as is known in the art The invention provides a significant advantage in that it provides full use of the transmit and receive antenna resources, while one or more receive radiation patterns are disabled from reception of the transmitted signal.

DRAWINGS

Figure 2:
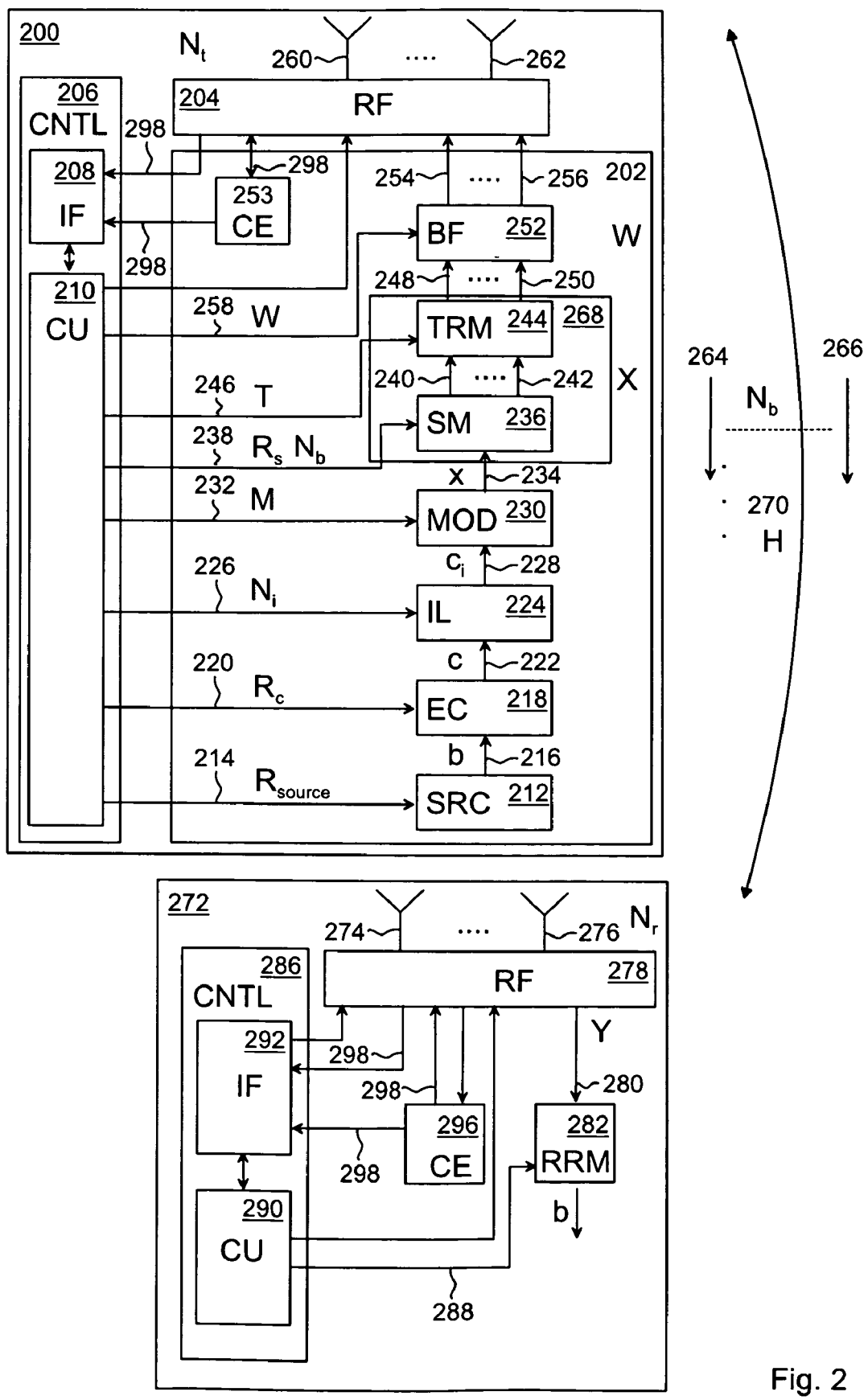
Figure 3:
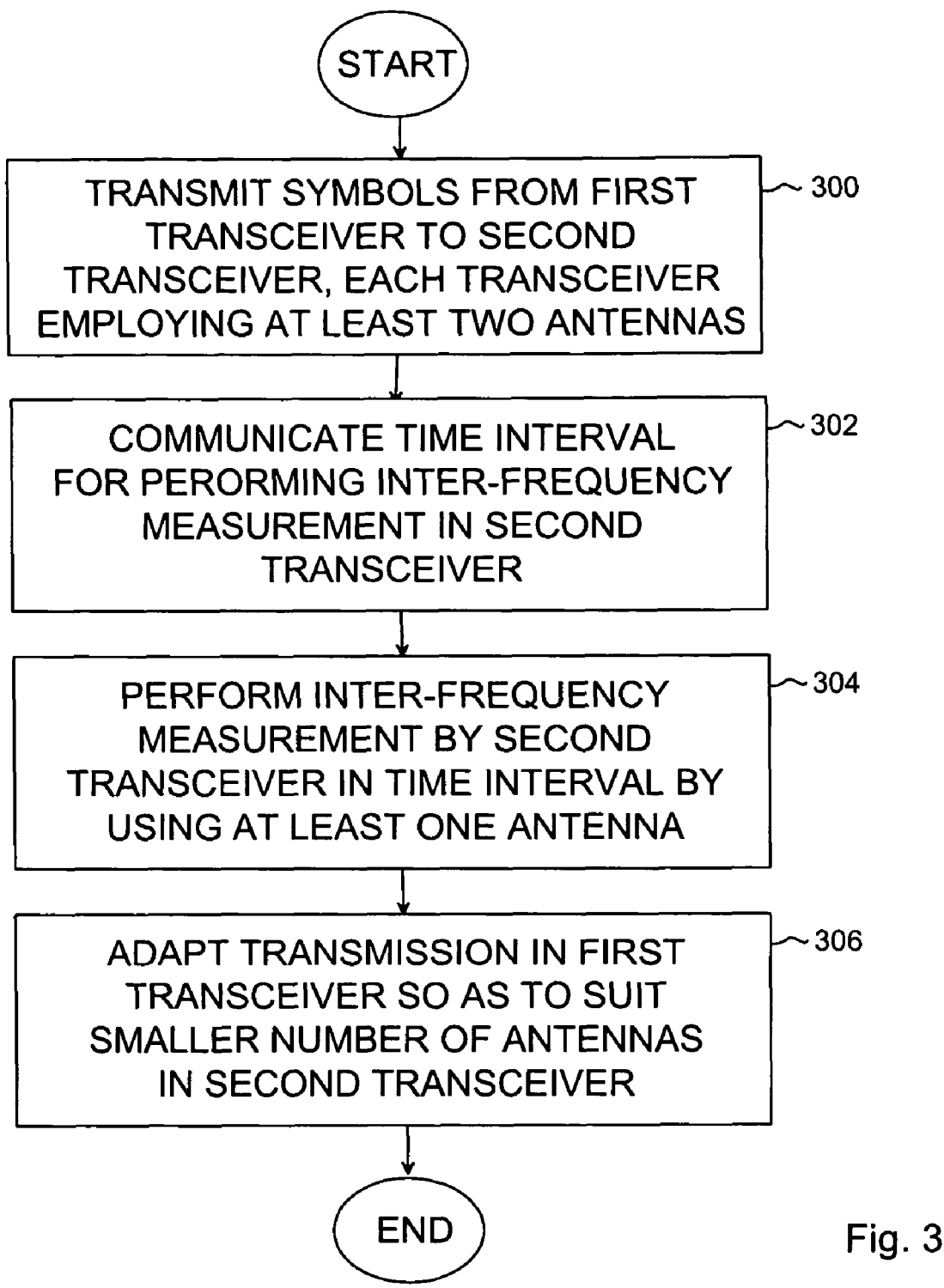

In the following, the invention will be described in greater detail with reference to the preferred embodiments and the accompanying drawings, in which FIG. 1 shows an example of the structure of a telecommunications system, FIG. 2 shows an example of the structure of an arrangement for transmitting and receiving a signal, and FIG. 3 shows an embodiment of a method according to the invention.

DETAILED DESCRIPTION OF SOME EMBODIMENTS

In the disclosure of the embodiments of the invention, reference is made, for the simplicity of the disclosure, to a number of transmit/receive antennas, which may be used for reception of the signal. The number of transmit/receive antennas may, however, be interpreted to refer to the number of transmit/receive radiation patterns, each being formed by using one or more transmit/receive antennas.

FIG. 1 is a simplified block diagram showing, at a network element level, the most important parts of an exemplified telecommunications system. The structure and functions of the network elements are only described when relevant to the present solution. Other networks may also be used, such as local area networks, and the invention or its implementation is not limited to the discussion and examples given below.

The main parts of the exemplified telecommunications system are a core network (CN) 100, a radio access network 130 and a mobile station (MS) 170. For the sake of simplicity, a radio access network called UTRAN (UMTS Terrestrial Radio Access Network) 130 is taken as an example.

On a general level, the telecommunications system can also be defined to comprise a mobile station and a network part. The mobile station is also called user equipment, a terminal, a subscriber terminal and a mobile telephone. The network part comprises the fixed infrastructure of the radio system, i.e. the core network and the radio access network.

The structure of the core network 100 corresponds to a system incorporating both circuit-switched and packet-switched domains. Both domains can utilize the same radio access network 130. For simplicity, the core network 100 is presented using the second generation telecommunications terminology. Corresponding structures and functionalities may be found in the third and fourth generations telecommunications system although their implementation may vary.

A mobile services switching center (MSC) 102 is the center point of the circuit-switched side of the core network 100. The mobile services switching center 102 is used to serve the connections of the radio access network 130. The tasks of the mobile services switching center 102 include: switching, paging, user equipment location registration, handover management, collection of subscriber billing information, encryption parameter management, frequency allocation management, and echo cancellation.

Large core networks 100 may have a separate gateway mobile services switching center (GMSC) 110, which is responsible for circuit-switched connections between the core network 100 and external networks 180. The gateway mobile services switching center 110 is located between the mobile services switching center 102 and the external networks 180. An external network 180 can be, for instance, a public land mobile network (PLMN) or a public switched telephone network (PSTN).

A serving GPRS support node (SGSN) 118 is the center point of the packet-switched side of the core network 100. The main task of the serving GPRS support node 118 is to transmit and receive packets together with the mobile station 170 supporting packet-switched transmission by using the radio access network 130 or the base station system. The serving GPRS support node 118 contains subscriber and location information related to the mobile station 170.

A gateway GPRS support node (GGSN) 120 is the packet-switched side counterpart to the gateway mobile services switching center 110 of the circuit-switched side with the exception, however, that the gateway GPRS support node 120 must also be capable of routing traffic from the core network 100 to external networks 182, whereas the gateway mobile services switching center 110 only routes incoming traffic. In our example, external networks 182 are represented by the Internet.

The radio access network 130 comprises radio network subsystems 140, 150. Each radio network subsystem 140, 150 comprises radio network controllers (RNC) 146, 156 and nodes B 142, 144, 152, 154. Node B is a rather abstract concept; the terms 'base transceiver station' or 'base station' are often used instead. In this application Node B is called a base station. The base station provides the mobile station 170 with radio transmission and reception. Solutions exist where the base station 142, 144, 152, 154 is capable of implementing both TDMA (Time Division Multiple Access) and WCDMA radio interfaces simultaneously.

The implementation of the radio network controllers 146, 156 may vary. Solutions may exist where at least a portion of the functionalities of a radio network controller 146, 156 is included in the base station 142, 144, 152, 154.

The mobile station 170 provides a user of the mobile station with access to the telecommunications system. The exemplified mobile station 170 comprises two parts: mobile equipment (ME) 172 and a UMTS subscriber identity module (USIM) 174. The mobile station 170 comprises at least one transceiver for establishing a radio link to the radio access network 130. The mobile station 170 may further comprise two different subscriber identity modules. The mobile station 170 further comprises an antenna, a user interface and a battery. Today, different types of mobile station 170 exist, for instance equipment installed in cars, and portable equipment.

The USIM 174 comprises user-related information and information related to information security, such as an encryption algorithm.

FIG. 2 shows an example of a multi-antenna transmission chain for a stream of information bits 216(b) from a first transceiver 200 to a second transceiver 272.

In an embodiment, the first transceiver 200 is a base station 142, 144, 152, 154, and the second transceiver 272 is a mobile station 170.

The exemplified first transceiver 200 includes a digital domain 202 and a radio frequency part 204. The digital domain 202 may include, for example, portions of a base band part of a base station 142, 144, 152, 154 and portions of a radio network controller 146, 156. The digital domain 202 may be implemented with digital processors, ASICs (Application Specific Integrated Circuit), and memory means.

The arrangement includes a controller, which may be a transmit controller 206 located in the first transceiver 200 and/or a receive controller 286 located in the second transceiver 272. The transmit controllers can also wholly or partially be located in an RNC 146, 156, for instance.

The transmit controller 206 may include an inter-frequency measurement coordinating unit 208 and a transmit control unit 210. The coordinating unit 208 may, upon channel estimation information, moving direction of the second transceiver 272 and other relevant information, determine a need for a handover of the second transceiver. Higher layer signaling may be used between the first and the second transceivers to determine a suitable time window in which the second transceiver can perform inter-frequency measurements. Inter-frequency measurements may also be needed in the absence of handovers or mobile movement. This may occur e.g. when resources are intended to be used at multiple transmit frequencies or transmission resources need to be adapted in multiple frequency bands, simultaneously or in turn.

The transmit control unit 210 provides transmit resource control information for the first transceiver 200.

The receive controller 286 may include an inter-frequency measurement unit 292 and a receive control unit 290. The receive control unit 290 provides receive resource control information for the second transceiver 272.

In some embodiments, information relating to inter-frequency measurements may be transferred between the transmit controller 206 and the receive controller 286 by using, for example, known signaling channels between the first transceiver 200 and the second transceiver 272. Therefore, the implementation and location of the inter-frequency coordinating units 208, 292 depend on the embodiment.

The information relating to inter-frequency measurements obtained by suitable post-processing, filtering, matrix decomposition of the signals, for instance, may include parameters relating to the effective transmit channels of the received signal, such as channel rank, channel eigenvalues, condition number, signal orthogonality parameters, effective signal-to-interference ratio at some part in receiver chain (after a linear detector or combiner, for instance) since such parameters or measurements are affected by the number or selection of receiving and transmitting antennas. Thus, the transmitter may need to know the channel parameters, of which it can implicitly derive the information on the receive antennas used for the inter-frequency measurements, for instance. The transmitter may then adapt its transmission accordingly. Thus, the measurement may be affected by the realizations of the physical MIMO channel, as well as other parameters.

Information relating to the inter-frequency measurements may also include information on how the transmission method between the transmitter and the receiver should be changed. For instance, if the space-time block coding between the transmitter and the receiver is to be changed, units 210 and 290 of the transmitter and the receiver may exchange information on the coding to be used. Alternatively, instead of signalling the coding to be used, the coding alternatives may be limited to a predetermined set of codes. For instance, in one embodiment, the transmitter and the receiver may always change the coding from DABBA to STTD, or toggle between two transmission methods with different characteristics, during the disablement of a receive antenna. The means and signalling techniques for enabling the change in the transmission method are known in the art. Here, at least one of the methods should be e.g. one which operates better in lower rank or more ill-conditioned MIMO channels. In the above example, STTD, or an orthogonal space-time (space-frequency) block code is insensitive to MIMO channel properties, where the symbols in a DABBA modulator can be unambiguously detected only with sufficiently high rank MIMO channels, essentially with at least two receive antennas.

The controllers 206, 286 may be implemented with a digital computer and software. Some functionalities, however, may be implemented with ASIC. The antenna resources are used in describing the measurements, but they can be also other radio frequency units in the receiver, such as an RF chain.

The exemplified first transceiver 200 includes an encoding unit (EC) 218, which receives a stream of information bits 216 from an information source (SRC) 212. The information source 212 may be a digital processor of a digital domain, for example. The information source is provided with source information 214, such as source rate ($R_{source}$), by the transmit control unit 210. The transmit control unit 210 may be in connection with the coordinating unit 208 so that the transmission of the first transceiver 200 can be controlled dependent on the time instance and number of receiving antennas used for the inter-frequency measurements performed by the receiver. Either one or both of the first transceiver or the second transceiver know that a particular interval is being used for inter-frequency measurements. If only the receiver, second transceiver, knows this, then the transmitter, first transceiver, resources need to be adapted e.g. based upon channel or signal measurements or channel quality indicators accordingly to enable reception with fewer antenna or RF resources. If also the transmitter knows this, the adaptation may be faster, as some designed transmission methods may be agreed beforehand and the change between different transmission methods may be signaled with only a few bits. The source information 214 defines, for example, the bit rate at which the information source 212 outputs the stream of information bits 216 into the encoding unit 218. The information source 212 may also manage tasks such as scheduling and retransmission of the data packets according to the source information 214, and potentially also according to the feedback information from the receiver. Therefore, the source information may also include scheduling information, such as channel state related information, such as channel quality, signal fading information, delay constraints or delay penalties for a given service, all of which affect the relative priority when allocating resources for different users and/or different services.

The scheduling may involve packet scheduling, which determines the order in which downlink transmissions for different users are transmitted, or more generally, the allocation of resources for different users. Resources may be defined as time-frequency-code slots, possibly combined with spatial resources, such as transmit beams, beam indices, beam codebooks, transmit directions, sector index or indices. Time slot allocation can be used for prioritizing transmission for services, e.g. the user with the best channel state (or channel-to-interference); this also applies to frequency and code resources.

The encoding unit 218 may encode the information bits 216 with codes, such as channelization codes and scrambling codes, and may provide a stream of coded bits (c) 222 for an interleaving unit (IL) 224. The encoding may or may not be specific to a communication channel between the first transceiver 200 and the second transceiver 272. The encoding is performed according to coding information 220 provided by the transmit control unit 210. The coding information 220 may include, for example, a code rate 220 characterizing the rate at which the information bits 216 are encoded. In addition, the coding information 220 may designate the encoding polynomials or encoder structure, selection of a coding method, and puncturing patterns for a selected coding method, for example.

The interleaving unit 224 may distribute the stream of coded bits 222 with interleaving information 226, such as an interleaving depth ($N_i$), over a predetermined time period, thus providing a stream of interleaved coded bits ($c_i$) 228 for a modulator unit 230. The interleaving information 226 characterizes the distribution of the stream of coded bits 222 in the predetermined time period, and is inputted into the interleaving unit 224 by the transmit control unit 210.

The interleaved coded bits 228 may be inputted into the modulator unit (MOD) 230, which maps the interleaved coded bits 228 into a complex modulator vector (x) 234. The modulator unit 230 may be provided with modulation information 232 by the transmit control unit 210. The modulation information 232 characterizes the modulation, defining, for example, the number (M) of interleaved coded bits 228 mapped into a complex modulator vector 234. The combination of the modulation symbols allocated to a communication channel may be specific to the communication channel.

The complex modulator vector 234 may be outputted from the modulator unit 230 into a spatial modulator unit (SM) 236. The spatial modulator unit 236 maps the modulation symbols or/and its repetitions, conjugates, negations, linear transformations of symbols, for instance to a multi-dimensional matrix and outputs at least two symbols 240, 242 to provide spatial modulation for the transmission. The symbols 240, 242 may also be modulated with independent or dependent modulation symbols. It is not compulsory to form two or more parallel symbol streams 240, 242, or send more than one symbol per channel using other matrix modulation means, since all operations may be carried out with one stream only. In linear modulation, the parallel symbol streams 240, 242 are modulated with bit/symbol-index-specific basis matrices, which designate the mapping of each parallel symbol stream 240, 242 to transmission resources or antenna elements or channels with different spatial characteristics (beam patterns).

The spatial modulator unit 236 is provided with spatial modulation information 238, such as symbol rate $R_s$ designating the number of embedded symbol streams (symbol rate) 240, 242, affecting the bit rates of different symbols, by the transmit control unit 210. The symbol rate $R_s$ characterizes the number of symbols allocated to or transmitted by each symbol time interval. In the simplest case, the symbol rate designates the number of essentially independent symbols contained in the spatial modulation per unit time. In an embodiment, the number of parallel symbol streams 240, 242 equals the number of radiation patterns 264, 266. In such a case, the first transceiver 200 transmits $N_b$ parallel communication streams from the transmit antenna elements 260, 262. In this context, an antenna element 260, 262 may also be a unit which includes a plurality of elementary antennas, such as directional or sectorized antennas.

The radiation patterns 264, 266 provide, together with the spatial modulation, efficient communication streams between the first transceiver 200 and the second transceiver 272. However, when the symbol rate is high, orthogonal transmission is not possible, and self-interference or co-channel interference similar to multi-user interference in CDMA or other multiple-access systems may occur between the symbols within the spatial modulation matrix, or the embedded symbol streams 240, 242.

In an embodiment of the invention, the symbol streams 240, 242 are inputted to a transmit resource multiplexing unit (TRM) 244, which further distributes, allocates or maps the modulation symbols to transmit communication resources according to transmit resource multiplexing information 246 provided by the transmit control unit 210. The transmit resource multiplexing information 246 includes, for example, the number (T) of transmission communication resources allocated to the symbol streams 240, 242. In addition, the transmit resource multiplexing information 246 may include information pertaining to multiplexing, such as channelization code information, carrier or sub-carrier frequencies, related signal-to-noise ratios, transmit power, and a radiation pattern or required coverage area information.

In an embodiment of the invention, the transmit communication resource unit 244 is capable of providing orthogonal transmission of the embedded bit or symbol streams 240, 242. The orthogonality of the transmission communication resources, and eventually the received symbols at the receiver may, however, be controlled by the transmit resource control information.

The transmit resource multiplexing unit 244 outputs data streams 248, 250, or the elements of the symbol vector or matrix, into a beam forming unit 252, which distributes the data streams 248, 250 to the at least two radiation patterns or beams provided by the transmit antenna elements 260, 262. The number of transmit antenna elements or beams 260, 262 is denoted by $N_t$. In an embodiment, a radiation pattern is specific to a communication channel between the first transceiver 200 and the second transceiver 272. The number of beams may or may not be identical to the number of transmit antenna elements, since radiation patterns may be formed in a multitude of ways. For example, directional radiation patterns may be formed with sectorization, or with different spatially selective (directional) antenna technologies. However, the discussion below assumes for simplicity, without restricting the invention in any way, that radiation patterns are formed using an array with Nt antenna elements.

The beam forming unit 252 is provided with beam forming information 258, such as complex antenna weights and the number $N_t$ of transmit antenna elements 260, 262 to be used in transmission, according to which the data streams 248, 250 are transmitted. The complex antenna weights may be represented by a weight matrix W. The number of radiation patterns is denoted by $N_b$. In an embodiment, a radiation pattern 264, 266 is an antenna beam. In some cases, the radiation patterns 264, 266 may be fully or partly predetermined. This is the case with a fixed-beam transmission, for example.

The radiation patterns 264, 266 may be separated from each other by a code, by spatial properties, such as form and direction, and/or by electromagnetic properties, such as frequency and polarization.

The beam forming unit 252 outputs a plurality of transmit signals 254, 256 to the radio frequency part 204. The radio frequency part 204 may include a plurality of transmitters which are capable of processing the transmit signals 254, 256 such that each transmit signal 254, 256 may be transmitted to the at least two radiation patterns 264, 266. The processing includes digital-to-analogue conversion, up-conversion to a radio frequency, amplifying, and filtering.

The radio frequency part 204 is provided with transmission information 268, such as power information, by the transmit control unit 210. The power information may control, for example, the transmit power with which the radiation patterns 264, 266 are transmitted.

For the ease of discussion, the functional entity, which includes the spatial modulator unit 236 and the transmit resource multiplexer 244, may be treated as a single multi-dimensional modulator unit 268, which distributes a sequence of $TR_s$ modulation symbols to $N_b$ radiation patterns 264, 266 provided by the transmit antenna elements 260, 262. In mathematical terms, the effect of the multi-dimensional modulator unit 268 on the interleaved coded symbols may be represented by a modulation matrix X.

It is noted that the invention is not restricted to the structure of the multi-antenna transmission chain described above, but may vary depending on the embodiment. For example, functionalities associated with the encoding unit 218, interleaving unit 224, and the modulator unit 230 may be performed in a combined unit, such as the multi-dimensional modulator unit 268. Furthermore, the order of the different elements may vary. For example, the interleaving unit 224 may be located between the beam forming unit 252 and the multi-dimensional modulator 268.

In an embodiment of the invention, the transmit communication resource includes a temporal transmit communication resource, such as symbol periods. In this case, the multi-dimensional modulator unit 268 acts like a space-time modulator applying e.g. space-time codes to the information bits 216. In space-time modulation, $TxR_s$ modulation symbols are distributed to $N_b$ radiation patterns during T symbol periods in order to provide transmission diversity and/or increased symbol rate. Distribution of the symbols across space and time dimensions provides spatial and time diversity. In the case of space-time/frequency coding, the transmit resource control information 246 includes matrix dimensions, such as the number of symbols, which may be embedded in the modulation matrix, bit-to-symbol mappings, relative and/or absolute transmit powers for different symbols or to spatial beam patterns. In one embodiment, the space-time or space-frequency or space-time-frequency block-coding, or the number of non-zero symbols or the symbol rate Rs, within the coding matrix, may be changed during the transmission if the receiver allocates one or more receiving antennas for the inter-frequency measurements. In such a case, the control unit 210 receives control information from the coordinating unit 208, whereby control information 238, 246 may take into account the reduced number of antenna elements in the second transceiver 272.

A temporal resource may also include a scheduling resource, which includes scheduling of a transmission of a modulation matrix, for example, according to control information provided by the transmit control unit 210. In the case of scheduling, the control information may include information reflecting the relative or absolute service priorities or efficiencies of channels on which the services are to be transmitted, as well as possibly the corresponding required transmission resources, such as beam-patterns, or transmit powers, and transmission rates.

A temporal resource may also include a re-transmission resource, which includes re-transmitting a portion of the stream of information bits 216 according to the control information provided by the transmit control unit 210.

In analogy with the temporal scheduling resource, there may also be a frequency scheduling resource, wherein the transmit frequencies, carriers, or subcarriers, are controlled in the transmitter In an embodiment, the transmit communication resource includes a spectral transmit communication resource, such as a transmit carrier or subcarrier frequency. In this case, the multi-dimensional modulator unit 268 typically distributes $TR_s$ modulation symbols to $N_b$ radiation patterns 264, 266 using T different carrier or subcarrier frequencies. The corresponding coding scheme may be called space-frequency coding. The space-frequency coding may be implemented by inputting at least partly different bit streams, or symbol streams 240, 242, into separate transmitters which utilize at least two different (sub)carrier frequencies for at least two embedded symbols or symbol streams. The different carrier frequencies may be generated in the radio frequency part 204 by means known to a person skilled in the art. The space-frequency coding provides spatial and frequency diversity or spatial-frequency multiplexing, or any combination thereof.

In an embodiment, the transmit communication resource includes an encoding resource, such as spreading coding. In this case, the parallel or embedded symbol streams 240, 242 may be provided with different coding. The corresponding coding scheme may be called space-code coding or space-time spreading.

In an embodiment, the transmit communication resource includes a spatial transmit communication resource, such as the number of antenna $N_t$ elements 260, 262 used in transmission. The spatial transmit communication resource may also include the number $N_b$ of radiation patterns 264, 266 used in transmission.

In an embodiment, the transmit communication resource includes transmit power with which the radiation patterns 260, 262 are transmitted.

It is noted that in some embodiments, the communication resources of different types may be combined in order to obtain an optimal performance of the telecommunications system. For example, temporal resources and spectral resources may be applied simultaneously, and a coding scheme may be selected accordingly.

With further reference to FIG. 2, the radiation patterns 264, 266 associated with the communication channels interact with the environment 270, which may affect the spatial, temporal and spectral properties of the communication channels between the first transceiver 200 and the second transceiver 272.

The radiation patterns 264, 266 are spatially sampled by at least one receive antenna element 274, 276 of the second transceiver 272 and the resulting radio frequency antenna signal is inputted into a radio frequency part 278 of the second transceiver 272. In an embodiment, the second transceiver 272 includes $N_r$ receive antenna elements 274, 276, or receive radiation or polarization patterns, wherein $N_r > 1$. When $N_r > 1$, the second transceiver 272 acts like a MIMO receiver.

In one embodiment, the second transceiver can temporarily have only one receive antenna element, that is $N_r = 1$, for data reception. Such a situation is possible when the second transceiver originally has two receive antenna elements for data reception but then allocates one antenna element of the two for inter-frequency measurements.

The radio frequency part 278 converts the radio frequency antenna signal from each receive antenna element 274, 276 to a base band signal 280 e.g. by, filtering, down-converting, and digitizing. In this case, the plurality of receive signals is presented with a single reference numeral 280. The base band signal 280 is inputted into the receive communication resource unit 282, which in some embodiments outputs information bits for further processing.

The receive communication resource unit 282 includes receive communication resources which are controlled according to receive resource control information 288 provided by the receive control unit 290.

The receive communication resources may include receive processing power, a number of RAKE fingers, equalizer filters or filter banks, a number of parallel code channels, a number of carrier or sub-carrier frequencies supported by the receiver, a correlator, a matched filter, a channel equalizer, a channel decoder, a hard or soft output detector, an interference cancellator, a selection of a subset of receive antenna elements from Nr antenna elements 274, 276.

The control of the receive resources may include
- allocating a different number of RAKE fingers or sub-carriers to a given service
- selecting a channel equalizer type from a plurality of alternatives, such as a linear or a non-linear equalizer
- selecting input and output sample rates from a plurality of different alternatives
- modifying receive antenna coefficients associated with receive antenna beams
- selecting the number of receive antenna beams
- selecting a desired subset of receive antennas for either interfrequency measurements, or for data communication Elements which are not controllable may exist in the receive communication resource unit 282. However, information on such elements may be included in the receive control information, and used as constraints when determining a performance measure for the communication channel. Such constraints may be, for example, the number of receive beam patterns, number of receive antennas 274, 276, carrier frequencies supported by the second transceiver 272. The control may be based on effective signal quality (e.g. channel quality indicator) that is assumed, foreseen, or estimated for a given selection of receiver resources. The selection may be defined so that a desired balance between the performance or reliability of inter-frequency measurements and the performance of data communication exists. In one embodiment, the receiver antennas are changed periodically, for inter-frequency measurements, and for data reception. This solution does not necessarily require evaluation of channel quality indicators, as the solution is aimed to provide diversity. Diversity in inter-frequency measurements is obtained, when a different antenna is used e.g. at different times, since the channel properties or characteristics at different receiving antennas may be different both instantaneously or in the long-term. This asymmetry, justifying also diversity measurements described above, may be due to antenna element location, (spatial) channel properties, antenna properties, etc.

The elements 212 to 262 in the first transceiver 200 may compose a transmit portion of the communication channel. The elements 274 to 282 in the second transceiver may compose a receive portion of the communication channel. Furthermore, the radio channel between the first transceiver 200 and the second transceiver 272 composes an air-interface portion of the communication channel. In a broad sense, the communication channel may be understood as a combination of transmission methods, reception methods, characteristics of the radio channel, characteristics of the hardware, and use of communication resources.

With further reference to FIG. 2, a communication channel between the first transceiver 200 and the second transceiver 272 may be characterized with a channel model $$\underset{T \times N_r}{Y} = \underset{T \times N_b}{X} \times \underset{N_b \times N_t}{W} \times \underset{N_t \times N_r}{H} + \underset{T \times N_r}{n} \quad (1)$$

wherein X is a modulation matrix characterizing the effect of the multi-dimensional modulator 268 on the interleaved coded bits 228, W is an antenna weight matrix representing the effect of the beam forming unit 252 on the data streams 248, 250, H is a channel matrix representing radio channel information between the first transceiver 200 and the second transceiver 272. The columns of the channel matrix H designate channel vectors from $N_t$ transmit antennas 260, 262 to $N_r$ receive antennas 274, 276. Furthermore, Y represents the received signal matrix, and n is a noise matrix characterizing the noise of the communication channel. In vector modulation, $N_b$ symbols are transmitted using 1 times $N_b$ dimensional vector X, i.e. T=1, whereas in matrix modulation T>1.

As an example of a conventional MIMO vector modulation model, consider a $(N_t, N_r)$-MIMO system where K independent data streams denoted by a vector of size K×1 are transmitted through a flat Rayleigh fading and possibly correlated channel. Therefore, the received signal vector for $N_r$ antennas is given by $$y = W_{Rx} H W_{Tx} x + n, \quad (2)$$

where $W_{Tx}$ of size $N_t \times K$ and $W_{Rx}$ of size $N_r \times N_r$ are the transmit and receive beam forming matrices, respectively, with unit norm and orthogonal column vectors, H of size $N_r \times N_t$ is the impulse response of the channel with complex Gaussian entries having zero mean and unit variance, and n is additive white Gaussian noise with variance $N_0 = \sigma^2$ per complex entry. It is possible to set $W_{Rx} = I_{N_{Rx}}$, if an additional linear or non-linear receive processing is allowed. The transmit power may be different for different streams, i.e. different coordinates of the x vector. In this transmission method, the individual streams are linearly combined only via the channel coefficients within the physical channel matrix H, and possibly also with beam forming matrices. Each stream is transmitted only via one transmit beam, and the inter-stream interference depends primarily on the physical channel and the beam forming matrices.

As an example of the multi-dimensional modulation where at least symbol streams are transmitted via at least two beams, let us consider a modulation matrix which carries out an orthogonal or non-orthogonal modulation or coding for information symbols.

In an embodiment, the modulation matrix X includes at least one symbol, which is transmitted using at least two antenna resources within at least two symbol time intervals. The modulation matrix X may include only one row for forming vector modulation, or a plurality of rows for forming matrix modulation. The symbol rate of the modulation may be greater than one. A symbol time interval is the time required for transmitting one row of the modulation matrix. The symbols within the modulation matrix may further be multiplied by additional multiplexing resources, such as spreading codes, carrier waveforms, sub-carrier waveforms, and the like. For example, each symbol may be multiplied by a different or the same spreading code. This increases the number of rows in a symbol matrix by a factor of N, where N is the length of the spreading code.

Various schemes may be applied to forming the modulation matrix. One solution is disclosed in U.S. Pat. No. 6,185, 258 by Alamouti et al. According to the above cited reference, the modulation matrix may be expressed as $$X_{Ala}(z_1, z_2) = \begin{bmatrix} z_1 & -z_2^* \\ z_2 & z_1^* \end{bmatrix}, \quad (3)$$

The modulation matrix shown in equation (3) exemplifies a 2 by 2 space-time orthogonal block code. It employs two transmit antenna elements 260, 262 or beams during two symbol periods. The symbol rate is one, since two symbols are transmitted in two time slots. The code formed according to equation (3) is orthogonal in the sense that when multiplied together with its Hermitian transpose, a scaled identity matrix is obtained. The Hermitian transpose of a matrix A, denoted by $A^H$, is the complex conjugate transpose of A. The transpose of a matrix is derived by reversing the row and column indices of the matrix. The identity matrix, denoted by I, is a matrix with zero off-diagonal element and unity diagonal elements. Accordingly, for an orthogonal-based matrix A, it holds that $A^H A = A A^H = kI$, for some real value k. The orthogonality of the modulation matrix according to equation (3) enables separate decoding of the two symbols in such a way that symbols do not interfere with each other. Here, as below, time is used as an example of an orthogonal multiplexing resource. It is possible to send symbols using different orthogonal waveforms, such as essentially orthogonal sub-carriers in OFDM, essentially orthogonal codes, etc.

As another example of a rate one modulation matrix, we may consider STTD-OTD scheme (4)

$$X_{STTD-OTD} = \begin{bmatrix} X_A(x1, x2) & 0_2 \\ 0_2 & X_B(x3, x4) \end{bmatrix}, \quad (4)$$

wherein $X_A$ and $X_B$ denote STTD blocks with independent blocks. $0_2$ are 2×2 zero matrices. In space-time coding, different submatrices of (4) are transmitted over different space-time channels. For example, $X_A$ may be transmitted from antennas 1 and 2 during two symbol periods. In space-frequency coding, $X_A$ and $X_B$ may be transmitted simultaneously using two orthogonal subcarrier frequencies. In space-code coding, the orthogonal unit separating the rows may be a spreading code. Indeed, any substantially orthogonal multiplexing unit, such as time, frequency, code or waveform may be used in separating matrix elements, or any combination thereof.

The orthogonality requirement leads to modulation matrices which suffer from rate limitation problems. As an example, the maximum symbol rate for an orthogonal transmit diversity code with four transmit antenna elements 260, 262 is ¾. When the rate loss is not allowed, the code orthogonality is sacrificed. In an example code, the signal is transmitted by using the transmit diversity code matrix $$X_{NOBSTBC} = \begin{bmatrix} z_1 & -z_2^* & z_3 & -z_4^* \\ z_2 & z_1^* & z_4 & z_3^* \\ z_3 & -z_4^* & z_1 & -z_2^* \\ z_4 & z_3^* & z_2 & z_1^* \end{bmatrix}. \quad (5)$$

The code described above yields good performance in a fading channel. However, due to the non-orthogonality, there is an inherent performance loss unless a receiver signal processing algorithm, an equalizer, detector, or another receiving element is able to tackle non-orthogonal correlating symbol streams. A maximum likelihood detector, posed to deliver a posteriori probabilities for each symbol or bit within each symbol yields acceptable desired performance, whereas linear receivers, such as those applying the MMSE principle, may induce a performance loss. Soft outputs, such as a posteriori probabilities, are typically forwarded to a channel decoder, in the presence of a concatenated encoding chain.

Even higher symbol rates may be needed in future communication systems. When the symbol rate is increased to two, a number of solutions exist, as is understood from the following examples. The symbol rate two matrix modulation may be based on schemes such as double space-time transmit diversity (DSTTD) coding or double ABBA (DABBA) coding, for example. The invention is not, however, restricted to the afore-mentioned methods, but may be applied to any modulation method wherein modulation symbols are distributed to a plurality of transmit antenna elements and transmit beams. In the DSTTD coding, two space-time transmit diversity (STTD) codes are transmitted from four transmit antenna elements 260, 262 using modulation matrix $$X(x_1, \ldots, x_4) = [X(x_1, x_2) \, X(x_3, x_4)], \quad (6)$$

wherein $x_1, \ldots x_4$ are modulation symbols, and $X(x_1, x_2)$ and $X(x_3, x_4)$ are sub-orthogonal space-time block coded sub-matrices of the modulation matrix. In this case, the number of $x_1, \ldots x_4$ symbols is 4 and the symbol rate $R_s$ is 2. The modulation symbols $x_1, \ldots x_4$ may be arbitrary, e.g. quadratic phase shift keying symbols, for example. Naturally, the discussion above on using arbitrary essentially orthogonal multiplexing resources applies here as well.

Thus, in one embodiment of the invention, during inter-frequency measurement performed by the receiver the transmitter may adapt its transmission by changing the modulation matrix from DSTTD to STTD-OTD. The symbol rate is thus reduced from 2 to 1 and the transmission may be received by a smaller number of receiving antennas at the receiver.

As an example, we may consider another embodiment, wherein the receiver has 2 RF chains, or at least 2 spatial receive channels, and the transmitter uses DABBA modulation prior to or after the inter-frequency measurements. The inter-frequency measurements are made in the receiver by using an RF measurement unit in one receiving antenna. During this period, the symbol rate is at most 1, the transmitter using STTD, threaded MIMO modulation, layered MIMO modulation, coordinate interleaved MIMO modulation, or some space-time block code having a symbol rate of at most 1, such as Diagonal-ABBA or Trombi. Also, the transmitter may puncture one of the two embedded symbols in a DABBA modulator having symbol rate two to enable reception with only one receive antenna. Similarly, if symbol rate four modulation method is used before or after measurements, while making measurements, the modulation method may be changed to so that the effective symbol rate is less than four while making the measurements.

Presented changes in modulation during the inter-frequency measurements are mentioned only as an example and thus any conversion that maintains the number of transmit antennas and reduces the symbol rate so as to suit the number of receiving antennas, is applicable.

FIG. 3 shows one embodiment of a method according to the invention. In start, there are two transceivers communicating with each other. A first transceiver can be a base station and a second transceiver can be a mobile terminal, for instance. In point 300, the first transceiver transmits a signal including symbols to the second transceiver. The first transceiver employs at least two transmit antennas and the second transceiver employs at least two receiving antennas. The information content of a symbol is distributed in the transmitter over two transmit antennas or two radiation patterns. Thereby, as an example, a symbol is transmitted over a first antenna unmodified whereas a complex conjugate of the same symbol is transmitted over a second transmit antenna.

In point 302, the first transceiver and the second transceiver communicate a time interval such as a frame, in which the second transceiver performs an inter-frequency measurement. A trigger for the inter-frequency measurement can be a handover, for instance. Alternatively, the second transceiver may perform measurements on an inter-frequency band by using at least one receive antenna. Thus, during the inter-frequency measurements, the receiver receives data by using a reduced number of receive antennas. Simultaneously, during the inter-frequency measurements, the receiver may extract channel parameters of the receive channel such as channel rank, channel eigenvalues, condition number, signal orthogonality parameters or effective signal-to-interference ratio. The receiver may then report the channel parameters to the transmitter, which may implicitly find out from the values of the channel parameters that the receiver is carrying out inter-frequency measurements.

Although point 302 refers to inter-frequency measurement, the receiver may disable one receive antenna for some other reason, such as for saving receiver power resources when operating e.g. in idle mode. The receiver may then inform the transmitter that the transmission method should be changed.

As shown by point 304, the second transceiver performs inter-frequency measurement in the specified time interval. The second transceiver reserves at least one of the at least two receiving antennas for the inter-frequency measurement.

In point 306, the first transceiver adapts its transmission so as to suit a smaller number of antennas in the second transceiver. Although shown separate, points 304 and 306 may be performed simultaneously during the same time period, during which the second transceiver performs the inter-frequency measurements.

In one embodiment, the first transceiver maintains the number of transmit antennas, whereby the effectiveness of the transmission is maintained. In one embodiment, the transmitter (first transceiver) may use different encoding and/or interleaving so that the transmitted information can be received with a smaller number of receiving antennas. In another embodiment, the transmitter may change the modulation method used in transmitting the signal. In still another embodiment, beam-forming weights can be altered during the inter-frequency measurement.

The invention may be implemented by software. There may be a software product including software code portions in a transmitter and/or receiver. The software code portions are configured to implement method steps of the invention. The software product(s) may be loadable and executable on processors of a transmitter/receiver. Alternatively, the invention may be implemented by ASIC (Application Specific Integrated Circuit), by separate logic components or by some corresponding manner.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
   at least one memory including computer program code; and
   at least one processor,
   the at least one memory and the computer program code being configured to, with the at least one processor, cause the apparatus at least to:
   process a signal including symbols from a transmitter by using Nr receive radiation patterns, the symbols being transmitted so that information content of a symbol of temporal length T is transmitted using the at least two transmit radiation patterns;
   disable N receive radiation patterns, wherein $1<=N<Nr$ from the processing of the signal so that Nr−N effective receive radiation patterns are formed;
   process the signal adapted to Nr−N effective receive radiation patterns so that transmit radiation patterns or the number of symbols in a time interval of length T when receiving with Nr−N effective receive radiation patterns is less than or equal to a separate number of symbols received in a time interval of length T when the apparatus is processing the signal received with Nr receive radiation patterns,
   wherein the apparatus is configured to process each symbol distributed over at least two transmit radiation patterns by beam-forming wherein the apparatus is configured to process the signal as adapted to a reduced number of receive radiation patterns of the apparatus by changed beam-forming weights.

2. The apparatus according to claim 1, wherein the apparatus is configured to reserve N receive radiation patterns for an inter-frequency measurement.

3. The apparatus according to claim 2, wherein the apparatus is configured to reserve a measurement unit for the inter-frequency measurement, which measurement unit is configured to use one or more receive radiation patterns when performing the inter-frequency measurement.

4. The apparatus according to claim 2, wherein the apparatus is configured to select for the inter-frequency measurement a receive radiation pattern having a lowest quality value in view of a predetermined quality criterion when receiving the signal.

5. The apparatus according to claim 2, wherein the apparatus is configured to change periodically at least one receive radiation pattern used for the inter-frequency measurement.

6. The apparatus according to claim 2, wherein the apparatus is configured to perform the inter-frequency measurement without communicating a measurement time interval to the transmitter.

7. The apparatus according to claim 1, wherein the apparatus is configured to request the transmitter to change a transmission method of the signal.

8. The apparatus according to claim 1, wherein the apparatus is configured to control beam-forming weights with feedback signals and a rate of the feedback signals is increased while the N receive radiation patterns are disabled.

9. A method, comprising:
   processing a signal including symbols from a transmitter by using Nr receive radiation patterns, the symbols being transmitted so that information content of a symbol of temporal length T is transmitted using the at least two transmit radiation patterns;
   disabling N receive radiation patterns, wherein $1<=N<Nr$ from the processing of the signal so that Nr−N effective receive radiation patterns are formed;
   processing the signal adapted to Nr−N effective receive radiation patterns so that transmit radiation patterns or the number of symbols in a time interval of length T when receiving with Nr−N effective receive radiation patterns is less than or equal to a separate number of symbols received in a time interval of length T when an apparatus performing the processing is processing the signal received with Nr receive radiation patterns; and
   processing each symbol distributed over at least two transmit radiation patterns by beam-forming wherein the apparatus is configured to process the signal as adapted to a reduced number of receive radiation patterns of the apparatus by changed beam-forming weights.

10. The method according to claim 9, further comprising:
    reserving N receive radiation patterns for an inter-frequency measurement.

11. The method according to claim 10, further comprising:
    reserving a measurement unit for the inter-frequency measurement, which measurement unit is configured to use one or more receive radiation patterns when performing the inter-frequency measurement.

12. The method according to claim 10, further comprising:
    selecting for the inter-frequency measurement a receive radiation pattern having a lowest quality value in view of a predetermined quality criterion when receiving the signal.

13. The method according to claim 10, further comprising:
    changing periodically at least one receive radiation pattern used for the inter-frequency measurement.

14. The method according to claim 10, further comprising:
    performing the inter-frequency measurement without communicating a measurement time interval to the transmitter.

15. The method according to claim 9, further comprising:
requesting the transmitter to change a transmission method of the signal.

16. The method according to claim 9, further comprising:
controlling beam-forming weights with feedback signals and a rate of the feedback signals is increased while the N receive radiation patterns are disabled.

17. An apparatus, comprising:
pre-processing means for processing a signal including symbols from transmitter means by using Nr receive radiation patterns, the symbols being transmitted so that information content of a symbol of temporal length T is transmitted using the at least two transmit radiation patterns;
disabling means for disabling N receive radiation patterns, wherein 1<=N<Nr from the processing of the signal so that Nr–N effective receive radiation patterns are formed;
processing means for processing the signal adapted to Nr–N effective receive radiation patterns so that transmit radiation patterns or the number of symbols in a time interval of length T when receiving with Nr–N effective receive radiation patterns is less than or equal to a separate number of symbols received in a time interval of length T when the apparatus is processing the signal received with Nr receive radiation patterns, and for processing each symbol distributed over at least two transmit radiation patterns by beam-forming wherein the apparatus is configured to process the signal as adapted to a reduced number of receive radiation patterns of the apparatus by changed beam-forming weights.

18. A computer-readable medium encoded with instructions that, when executed in hardware, cause the hardware to perform a process, the process comprising:
processing a signal including symbols from a transmitter by using Nr receive radiation patterns, the symbols being transmitted so that information content of a symbol of temporal length T is transmitted using the at least two transmit radiation patterns;
disabling N receive radiation patterns, wherein 1<=N<Nr from the processing of the signal so that Nr–N effective receive radiation patterns are formed;
processing the signal adapted to Nr–N effective receive radiation patterns so that transmit radiation patterns or the number of symbols in a time interval of length T when receiving with Nr–N effective receive radiation patterns is less than or equal to a separate number of symbols received in a time interval of length T when an apparatus performing the processing is processing the signal received with Nr receive radiation patterns; and
processing each symbol distributed over at least two transmit radiation patterns by beam-forming wherein the apparatus is configured to process the signal as adapted to a reduced number of receive radiation patterns of the apparatus by changed beam-forming weights.

* * * * *